Oct. 25, 1932.  A. J. BRIGGS  1,884,554
PROCESS OF MAKING DEPOLARIZERS
Original Filed March 31, 1922
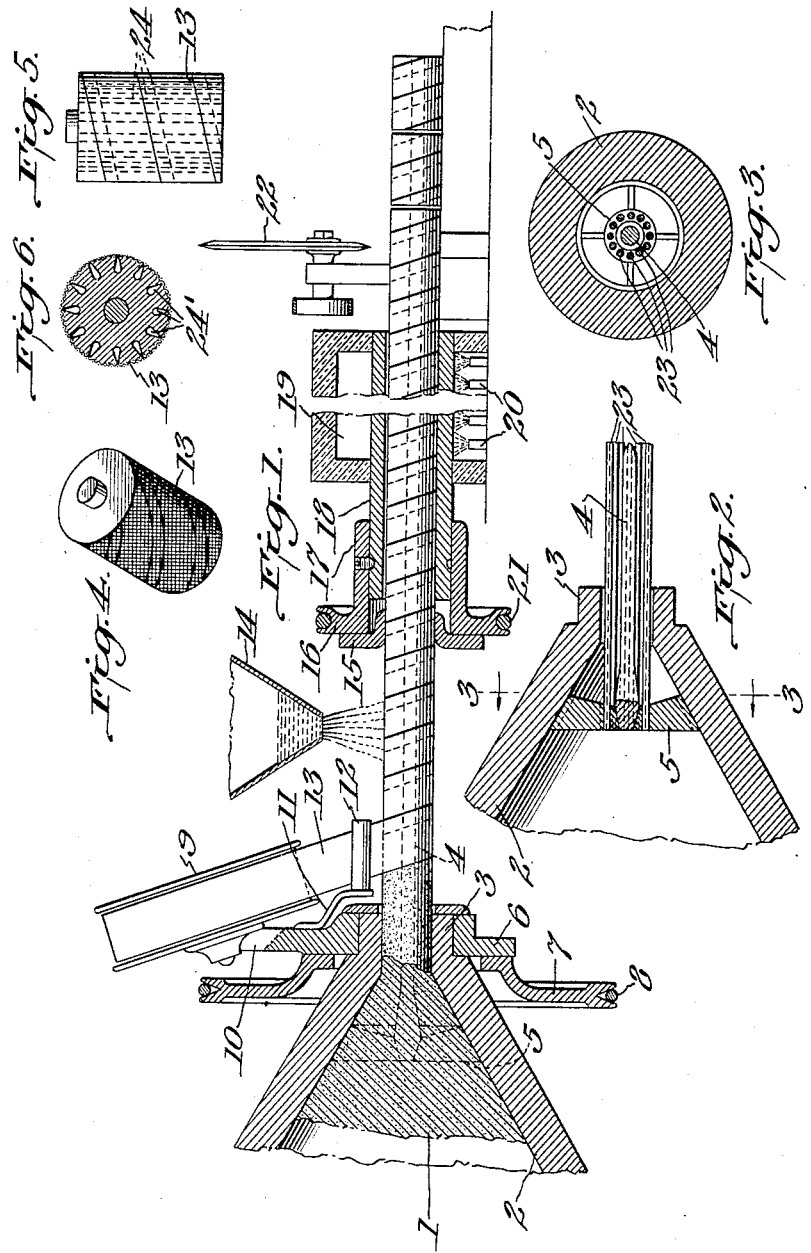

Patented Oct. 25, 1932

1,884,554

UNITED STATES PATENT OFFICE

ARTHUR J. BRIGGS, OF SYRACUSE, NEW YORK, ASSIGNOR TO NATIONAL CARBON COMPANY, INC., A CORPORATION OF NEW YORK

PROCESS OF MAKING DEPOLARIZERS

Original application filed March 31, 1922, Serial No. 548,420. Divided and this application filed June 15, 1927. Serial No. 199,079.

This invention relates to the manufacture of depolarizers for dry cells, and more particularly to improved procedure and apparatus for preparing such depolarizers. This application is a division of application Serial No. 548,420, filed March 31, 1922, wherein the improved depolarizer is disclosed and claimed.

The objects of this invention are to improve the quality of depolarizer bodies, to provide new forms thereof, and to decrease the costs and time of manufacture. This invention contemplates the application of extrusion apparatus and processes to the production of depolarizer bodies.

It has heretofore been proposed to prepare tubular mix bobbins by extrusion, to force a cylindrical carbon electrode into the perforation through each bobbin while the composition retains its plasticity, and to wrap each bobbin in a suitable fabric subsequent to the insertion of the electrode. In following such procedure, a large percentage of bobbins is broken, because the unsupported depolarizing material is easily disrupted by the outward pressure exerted by the electrode forced into the central opening in the bobbin.

According to the present invention, the depolarizing material is compacted and extruded as an elongated body having one or more holes extending lengthwise therethrough. This compacted elongated body is adapted to be cut transversely into a number of individual depolarizers, but prior to the severing operation the elongated body is peripherally reinforced, as by mechanically applying a wrapping thereto or coating the same with a suitable paste or adhesive substance, such wrapping and/or substance being preferably applied as the depolarizer composition is extruded. In the improved method, the covering or coating that engages the peripheral surface of the extruded body sustains or reinforces the latter during handling and during the cutting operation, thus reducing any tendency of the cutter or other mechanism to damage the main body or the individual depolarizers. Moreover, such reinforcement is also advantageous where carbon electrodes are inserted in the holes of the individual bodies, since a carbon electrode of sufficient size to insure adequate electrical connection between depolarizer and electrode may be inserted in the reinforced depolarizer without danger of damaging or destroying the depolarizer body or bobbin.

The objects and novel features of this invention will be apparent from the description and the accompanying drawing, which illustrates the invention as applied to the manufacture of a well-known type of depolarizer body. In the drawing, Fig. 1 is a longitudinal section through an extrusion and wrapping machine, Fig. 2 is a longitudinal section through a modified extrusion die, Fig. 3 is a transverse section on line 3—3 of Fig. 2, Fig. 4 is a perspective view of a wrapped body of mix, and Figs. 5 and 6 show mix bobbins provided with a plurality of vertical perforations, the former figure in elevation and the latter in transverse section.

Referring to Fig. 1 of the drawing, plastic depolarizing material 1 is forced forwardly through the funnel shaped member 2, preferably by substantially constant pressure derived from any suitable source. The funnel 2 terminates in a tubular extension 3 which operates as a die in forming an extruded body of the chosen diameter. When it is desired to provide the body with a cylindrical perforation, a core for the die consisting of a rod 4 of suitable cross-section is mounted in a spider 5 rigidly attached to the funnel wall. The rod 4 extends outwardly well beyond the tubular extension 3 and is preferably co-axial with the extension. The extended portion of the rod serves to support the extruded body during the wrapping operation.

The means for applying a protective wrapping to the extruded body comprises a reel carrier 6, journalled on extension 3 and held thereon by any suitable means. The carrier is adapted to be rotated about the longitudinal axis of the extruded body by means of a pulley 7, driven by belt 8. An inclined reel 9 is mounted upon an arm 10, integral with carrier 6. The arm 10 carries a bracket 11 to which is secured a guide rod 12 extending in close parallel relation to the extruded body. The fabric or other material 13 carried by the reel passes between the guide rod and the extruded body.

Rotation of the carrier 6 causes the fabric carried by the reel to be continuously drawn off and wrapped in an overlapping helix about the extruded mix. Guide rod 12 presses the fabric toward the mix to insure tight wrapping. If desired, the guide rod may be made adjustable so as to permit regulation of the tension at which the fabric is supplied. It may be stated that the term "fabric", as used herein, respecting the relatively wide continuous sheet or band 13 is to be considered generic to all of the bibulous materials which are suitable for wrapping mix bobbins.

The preferred means for securing the fabric about the mix comprises a container 14 arranged to discharge a regulated stream of paste or other adhesive material. A wiper 15, rotated by a pulley 16, engages the wrapping and uniformly distributes upon it the material supplied from container 14. The pulley 16 is preferably integral with an extension 17 keyed to a cylinder 18. Surrounding the major portion of the cylinder 18 is a heating chamber 19, in which the adhesive is hardened. Gas flames 20 or any other suitable source of heat may be supplied in the heating chamber. In the arrangement shown, belt 21 rotates the cylinder 18, so as to present all parts of its surface to the source of heat.

Instead of pasting the fabric, it may be secured by tying or the like. In some cases, also, the fabric may be omitted, and paste or other suitable material adapted to harden upon the bobbin surface may be applied directly thereto.

Any desired means for severing the elongated tubular body may be adopted. An eccentrically mounted cutting disc 22 has been illustrated by way of example. The severed portions may be delivered to packing devices or otherwise disposed of. If the product is wrapped depolarizing mix, carbon rods may be inserted by hand or the tubular sections may be fed into any suitable type of machine for automatic insertion of the rods. A wrapped bobbin so prepared is illustrated in Fig. 4. It will be noted that the ends of the bobbin are not covered. For many purposes the bobbin may be left in this condition, but discs of paper or the like may of course be placed over the ends, if desired. An advantage of the improved bobbin is the elimination of the objectionable bunching of fabric about the projecting end of the carbon rod, common to prior wrapped bobbins.

In the modified form of the invention illustrated in Figs. 2 and 3, a plurality of slender rods 23 are seated in the spider 5 and pass through extensions 3 in parallel relation to the core rod 4. This arrangement is especially designed for the production of mix bobbins for use in deferred action cells of the water activated type. The numerous perforations formed in the mix, by forcing it about rods 23, permit rapid absorption and even distribution of the activating liquid. A bobbin of this type, with cylindrical vertical openings 24, is shown in Fig. 5. Perforations 24', of a different shape, are illustrated in Fig. 6. Obviously the size, shape and location of the perforations may be greatly varied. They may be very conveniently made during the extrusion operation, as described, but may also be formed in other ways. For example ordinary tamped bobbins, or the extruded bobbins described herein, may be punched or bored to give the desired number of openings, and these need not extend entirely through the bobbin.

The cylindrical conformation of the bobbin and its axial perforation is shown by way of example only, as the shape of the extruded body may be varied according to its intended use. It is preferred to extrude the plastic material continuously, but an intermittent feed may be used, the wrapping and severing devices being synchronized with the movement of the extruded body. Various other departures from the specific form illustrated herein fall within the scope of the appended claims.

I claim:

1. Process of making depolarizing bobbins which comprises shaping the depolarizing material, applying a supporting depolarizer covering around the shaped material, and then inserting an electrode into the covered body.

2. Process of making depolarizing bobbins which comprises shaping the depolarizing material into an elongated body having a central hole therethrough; applying a protective reinforcement around the lateral surface of said body; severing said body at intervals in its length so as to produce a plurality of laterally reinforced and centrally apertured sections; and then inserting electrodes into the apertures of such sections.

3. Process of making depolarizer elements for dry cells which comprises extruding depolarizer material through a die so as to form an elongated body with a central hole therethrough, applying a surface reinforcement around the material exteriorly of the die, supporting the body from within during the reinforcement, removing the support, dividing the covered body into sections and inserting an electrode into each covered section.

4. Process of making depolarizer elements for dry cells which comprises extruding depolarizer material through a die so as to form an elongated body with a central hole therethrough, continuously applying a surface reinforcement around the material exteriorly of the die, continuously passing the material over a centrally disposed support during the reinforcement, removing the support, dividing the covered body into sections and inserting an electrode into each covered section.

In testimony whereof, I affix my signature.

ARTHUR J. BRIGGS.